United States Patent
Metwally et al.

(10) Patent No.: US 10,459,697 B1
(45) Date of Patent: Oct. 29, 2019

(54) DIFFERENCE VIEW MODE FOR INTEGRATED DEVELOPMENT ENVIRONMENTS

(71) Applicant: Microsoft Technology Licensing, LLC, Redmond, WA (US)

(72) Inventors: Ahmed Mohamed Metwally, Bothell, WA (US); Kenneth Lawrence Young, Sammamish, WA (US); Kesavan Shanmugam, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/970,612

(22) Filed: May 3, 2018

(51) Int. Cl.
*G06F 8/33* (2018.01)
*G06F 8/73* (2018.01)
*G06F 8/71* (2018.01)
*G06F 8/72* (2018.01)

(52) U.S. Cl.
CPC .............. *G06F 8/33* (2013.01); *G06F 8/71* (2013.01); *G06F 8/72* (2013.01); *G06F 8/73* (2013.01)

(58) Field of Classification Search
CPC ..... G06F 8/33; G06F 8/71; G06F 8/72; G06F 8/73
USPC ................................................ 717/120–123
See application file for complete search history.

(56) References Cited

U.S. PATENT DOCUMENTS

| | | | | |
|---|---|---|---|---|
| 6,560,620 B1* | 5/2003 | Ching | ............. | G06F 17/27 707/999.202 |
| 2002/0166081 A1* | 11/2002 | Richardson | ............. | G06F 16/10 714/33 |
| 2003/0131342 A1 | 7/2003 | Bates et al. | | |
| 2013/0332902 A1* | 12/2013 | Wang | ............. | G06F 8/38 717/122 |
| 2013/0346909 A1* | 12/2013 | Advani | ............. | G06F 8/33 715/781 |
| 2014/0282377 A1* | 9/2014 | Hammontree | ............. | G06F 8/33 717/109 |
| 2015/0033210 A1 | 1/2015 | Deckert et al. | | |

OTHER PUBLICATIONS

Pal, et al., "An Advanced Interface to a Switching Software Version Management System", In the Proceedings of Seventh International Conference on Software Engineering for Telecommunication Switching Systems, Jul. 3, 1989, pp. 110-113.
"International Search Report and Written Opinion Issued in PCT Application No. PCT/US19/029249", dated Aug. 7, 2019, 14 Pages.

* cited by examiner

*Primary Examiner* — Qing Chen
(74) *Attorney, Agent, or Firm* — Alleman Hall Creasman & Tuttle LLP

(57) ABSTRACT

A computer device is provided that includes a display and a processor configured to execute an integrated development environment that includes code development tools, output for display on the display an editor window of the integrated development environment configured to present a code file and real-time mark-up of the code file, wherein the editor window includes a difference view mode that causes the editor window to emphasize a difference between the code file and a baseline code file. The processor is further configured to perform a function of one of the code development tools on the code file and present a result of the function in the editor window while in the difference view mode.

16 Claims, 7 Drawing Sheets

FIG. 2

EDITOR WINDOW 30

CODE FILE 32

| | |
|---|---|
| L1 | BASELINE CODE INSTRUCTION |
| L2 | { |
| L3 | //BASELINE COMMENT |
| L4 | //NEW COMMENT 44A |
| L5 | NEW CODE INSTRUCTION 34A |
| L6 | |
| L7 | BASELINE CODE INSTRUCTION |
| L8 | BASELINE CODE INSTRUCTION |
| L9 | |
| L10 | |
| L11 | } |
| L12 | |
| L13 | |
| L14 | |

BASELINE CODE FILE 40

| | |
|---|---|
| L1 | BASELINE CODE INSTRUCTION |
| L2 | { |
| L3 | //BASELINE COMMENT |
| L4 | |
| L5 | BASELINE CODE INSTRUCTION |
| L6 | BASELINE CODE INSTRUCTION |
| L7 | |
| L8 | BASELINE CODE INSTRUCTION 34B |
| L9 | |
| L10 | } |
| L11 | |
| L12 | |
| L13 | |

DEBUGGING DATA 54

FIG. 3

TOOL BAR

EDITOR WINDOW 30

BASELINE CODE FILE 40

- L1 BASELINE CODE INSTRUCTION
- L2 {
- L3   //BASELINE COMMENT  — 50
- L4
- L5 BASELINE CODE INSTRUCTION
- L6 BASELINE CODE INSTRUCTION
- L7
- L8 BASELINE CODE INSTRUCTION 34B  — 48
- L9
- L10 }
- L11
- L12
- L13

CODE FILE 32

- L1 BASELINE CODE INSTRUCTION
- L2 {
- L3   //BASELINE COMMENT
- L4   //NEW COMMENT 44A   — 48
- L5 NEW CODE INSTRUCTION 34A
- L6
- L7 EXCEPTION THROWN 52
- L8   REASON FOR
- L9   EXCEPTION...         — 50
- L10
- L11 }
- L12
- L13
- L14

56

DEBUGGING DATA 54

28

DIFFERENCE VIEW MODE FOR INTEGRATED DEVELOPMENT ENVIRONMENTS

BACKGROUND

While working on changes to a codebase, it is important for developers to understand what has changed between each version of the codebase. However, when multiple developers are collaborating in teams during development, it may become difficult to keep track of all of the changes made by each developer and how those changes will affect the stability of the codebase.

SUMMARY

To address the issues discussed above, a computer device is provided. The computer device includes a display and a processor configured to execute an integrated development environment that includes code development tools, output for display on the display an editor window of the integrated development environment configured to present a code file and real-time mark-up of the code file, wherein the editor window includes a difference view mode that causes the editor window to emphasize a difference between the code file and a baseline code file. The processor is further configured to perform a function of one of the code development tools on the code file and present a result of the function in the editor window while in the difference view mode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows an example graphical user interface of an integrated development environment implemented by the computer device of FIG. 1.

FIG. 3 shows another example graphical user interface including a breakpoint development tool and a debugging development tool of the integrated development environment implemented by the computer device of FIG. 1.

DETAILED DESCRIPTION

Difference view add-ons for an integrated development environment (IDE) open new tabs in the IDE separate from the main editor window that show differences between two code files. Typically, these difference view add-ons are not fully integrated with the IDE, and are unable to access the various development tools offered by the IDE, such as, for example, debugging tools, code editing tools, symbolic analysis tools, and other types of development tools. Thus, in order to access the full developmental features of IDE, users of these difference view add-ons must typically tab back and forth between the main editor window of the IDE and the window of the difference view add-on.

Figure 1:
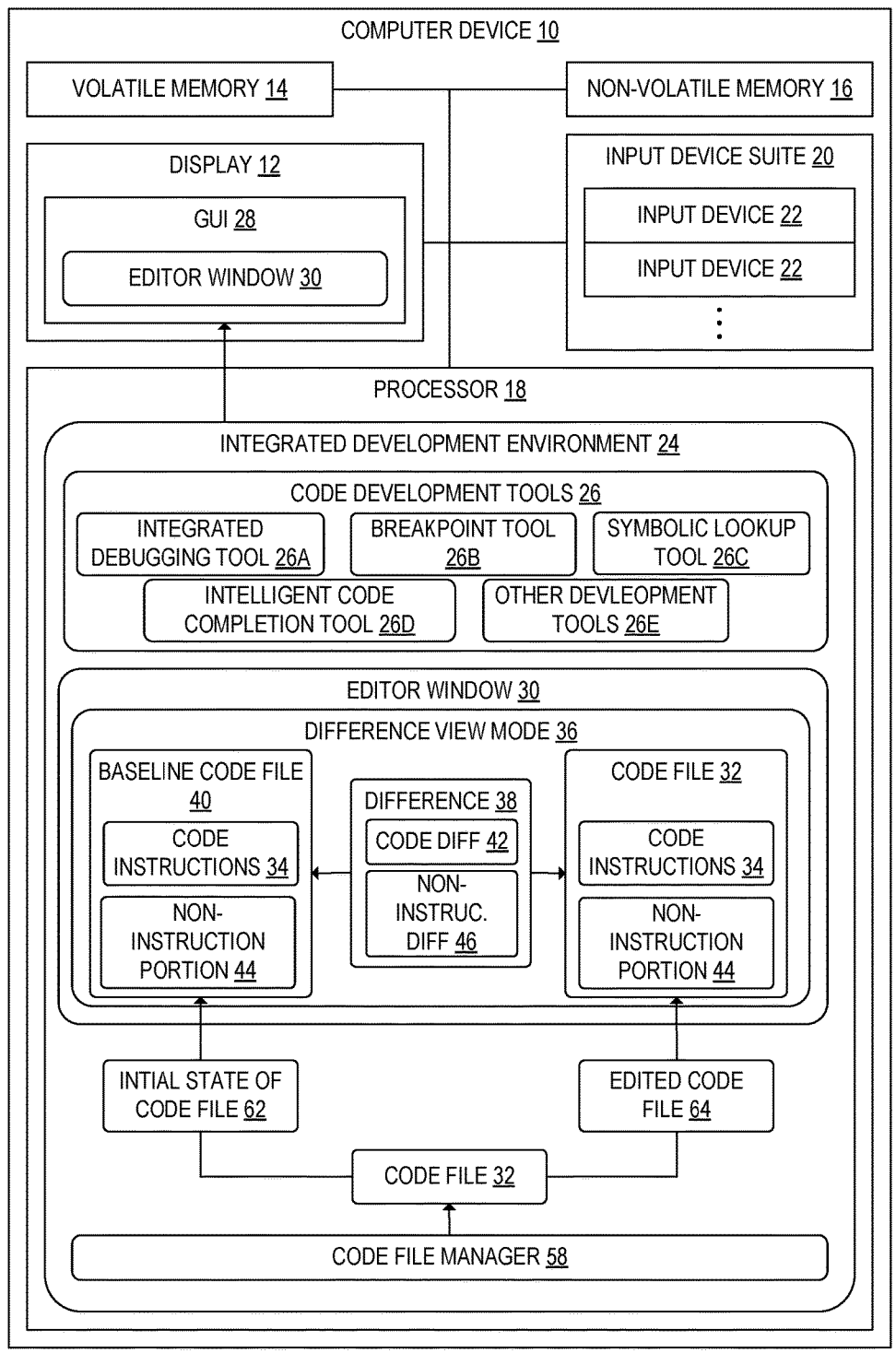
FIG. 1 shows an example computer device implementing an integrated development environment according to one embodiment of the present disclosure.

In order to address the challenges discussed above, a computer device 10 is provided, as shown in the example embodiment of FIG. 1. The computer device 10 may include a display 12, volatile memory 14, non-volatile memory 16, a processor 18, and/or an input device suite 20 including one or more input devices 22. The one or more input devices 22 may include, for example, one or more of a keyboard, a mouse, a trackpad, a touchscreen, a microphone, a camera, an inertial motion unit, a global positioning system (GPS) unit, and/or some other input device 22. In addition to the display 12, the computer device 10 may further include one or more other output devices, such as a speaker, a haptic feedback unit, or another type of output device.

The processor 18 of the computer device 10 may be configured to execute an integrated development environment (IDE) 24 that includes a source code editor for editing code files. The IDE 24 may also include code development tools 26, such as, an integrated debugging tool 26A, a breakpoint tool 26B, a symbolic lookup tool 26C, an intelligent code completion tool 26D, and other types of development tools 26E.

In one example, the integrated debugging tool 26A may be configured to provide functions for viewing a call stack of a currently executing code file at a designated point in time. The integrated debugging tool 26A may also provide functions for changing variable values while the code file is running, inspect the values of variables while the code file is running, skip or repeat sections of code of the code file, examine memory contents associated with the running code file, view thread contexts for multi-threaded applications, and other types of debugging functions. The integrated debugging tool 26A may also include the breakpoint tool 26B configured to halt execution of a code file when a set breakpoint in the code file is reached. The integrated debugging tool 26A may be configured to generate debugging events, such as, for example, an exception that is thrown for a code file, a breakpoint event for a running code file that has reached a breakpoint set via the breakpoint tool 26B, or some other condition that triggers a debugging event.

The symbolic lookup tool 26C may be configured to provide functions for navigating to selected classes, files, and/or symbols specified by names. The intelligent code completion tool 26D may provide functions for context-aware code completion by presenting auto completion pop-ups as the user is typing to reduce typographical and syntactical errors. It will be appreciated that the development tools 26 described above are merely exemplary, and that the IDE 24 may include other development tools 26E not specifically described above.

As illustrated in FIG. 1, the processor 18 may be configured to output for display on the display 12 a graphical user interface (GUI) 28 of the IDE 24. The GUI 28 may include various GUI elements, such as, for example, a tool bar, windows, and other GUI elements that a user of the computer device 10 may utilize to enter input to the IDE 24 via the input device suite 20. In one example, the GUI 28 output to the display 12 includes an editor window 30 of the IDE 24 configured to present a code file 32. The editor window 30 may be configured to display each of the code instructions 34 of the code file 32. The editor window 30 may also be configured to display GUI elements for organizing the displayed code instructions 34, such as, for example, line numbers. The editor window 30 may also display real-time mark-up of the code file 32 as the user edits/changes the code instructions 34, adds/deletes comments, or otherwise edits the code file 32. For example, the editor window 26 may indicate one or more syntax errors in the code file 32.

The editor window 30 includes a difference view mode 36 that causes the editor window 30 to emphasize a difference 38 between the code file 32 and a baseline code file 40. The difference 38 may be determined by the processor 18 in real-time by comparing the code file 32 to the baseline code file 40. The difference 38 may include a code difference 42 between the code instructions 34 of the code file 32 and the baseline code file 40. For example, the code difference 42 may include one or more code instructions 34 that have been added to the code file 32, deleted from the code file 32, and/or partially replaced or otherwise edited compared to the code instructions of the baseline code file 40.

The difference 38 may further include changes to one or more non-instructions portions 44 of the code file 32, such as comments and/or whitespace. As shown, the difference 38 may include a non-instruction difference 46 between code comments or whitespaces of the code file 32 and the baseline code file 40. It will be appreciated that other types of differences between the code file 32 and the baseline code file 40 may also be determined and emphasized by the editor window 30.

In one example, the IDE 24 may be configured to toggle on the difference view mode 36 of the editor window 30 for an already opened code file 32 in response to an event. For example, if the user edits/changes the already opened code file 32, the IDE 24 may be configured to toggle on the difference view mode 36 for the editor window 30 presenting the opened code file 32. As another example, a code file 32 may be opened in the editor window 30 directly into the difference view mode 36 in response to an event, such as, for example, a debugging event of the integrated debugging tool 26A.

Turning to FIG. 2, an example GUI 28 of the IDE 24 is illustrated. The illustrated GUI 28 includes the editor window 30 of the IDE 24 that is currently operating in the difference view mode 36. Thus, as shown, the editor window 30 visually presents the code file 32 and the baseline code file 40. In the illustrated example, the code instructions and comments of the code file 32 and the baseline code file 40 are organized by line number and presented side-by-side in the editor window 30. In this specific example, the code instructions at lines L1 and L2 of the baseline code file 40 remain unchanged in the code file 32. Similarly, the non-instruction comments at line L3 of the baseline code file 40 also remain unchanged in the code file 32.

However, at line L4 of the code file 32, the user has inserted a new comment 44A that is not included in the baseline code file 40. Similarly, at line L5 of the code file 32, the user has inserted a new code instruction 34A that is also not included in the baseline code file 40. The processor 18 detects these differences 38 of the new code instruction 34A and the new comment 44A, and emphasizes the detected differences 38 in the editor window 30.

In one example, to emphasize the detected differences 38 in the editor window 30, the processor 18 may be configured to highlight the lines in the editor window 30 that include code differences 42 and/or non-instruction differences 46. In the example illustrated in FIG. 2, a highlight 48 has been applied to lines L4 and L5 for the code file 32 to emphasize the new comment 44A and the new code instructions 34A to the user. A contrasting highlight 50 may also applied to a corresponding space of the editor window 30 for the baseline code file 40.

Continuing the illustrated example, lines L5, L6, and L8 of the baseline code file 40 include baseline code instructions. The baseline code instructions of lines L5 and L6 of the baseline code file 40 remain unchanged at lines L7 and L8 of the code file 32. However, the baseline code instructions of line L8 of the baseline code file 40 have been deleted from the code file 32. The processor 18 may detect this difference 38 of the deleted baseline code instruction 34B, and emphasizes the detected difference in the editor window 30. In the example illustrated in FIG. 2, a highlight 48 has been applied to line L8 for the baseline code file 40, and a contrasting highlight 50 has been applied to a corresponding space of the editor window 30 for the code file 32.

In one example, the highlight 48 and contrasting highlight 50 take the form of changes in background color or shading of the lines of the editor window 30. As another example, the highlight 48 may be a change in color of the code instructions or comments that have been changed. It will be appreciated that other forms and styles of emphasis may be used by the processor 18 to emphasize the differences 38 between the baseline code file 40 and the code file 32. For example, a change in font, bolding, underlining, strikethrough, italicization, etc., may be used to emphasize the differences 38 in the editor window 30.

Turning to FIG. 3, the processor 18 is configured to perform a function of one of the code development tools 26 on the code file 32 and present a result of the function in the editor window 30 while in the difference view mode 36. In one example, the one of the code development tools performed on the code file includes the integrated debugging tool 26A. The integrated debugging tool 26A may be configured to generate debugging events, such as, for example, an exception thrown for the code file 32. The processor 18 may be configured to detect the debugging event generated for the code file 32 by the integrated debugging tool 32.

In one example, the code file 32 may not currently be opened when the debugging event was generated for the code file 32. For example, the IDE 24 may currently be running a plurality of code files of a program that includes the code file 32, and may encounter a debugging event, such as an error, that occurs while the code file 32 is being run. In this example, the IDE 24 executed by the processor 18 may be configured to open the code file 32 in the editor window 30 in the difference view mode 36 based on at least detecting the debugging event generated by the integrated debugging tool 26A. That is, in response to detecting a debugging event for a code file 32 that is not currently opened, the IDE 24 may be configured to open that code file 32 in the editor window 30 directly in the difference view mode 36 with a suitable baseline code file 40, such as, for example, a previous version of the code file 32. In one example, multiple debugging events may be detected for multiple different code files, and the IDE 24 may be configured to concurrently open each of the multiple different code files in the editor window 30 in the difference view mode 36.

In one example, the debugging event generated by the integrated debugging tool 26A may include an exception thrown for the code file 32. In this example, after transitioning an editor window 30 already presenting the code file 32 into the difference view mode 36, or opening the code file 32 in the editor window 30 directly into the difference view mode 36, the IDE 24 may be configured to present the exception 52 in the editor window 30 in the difference view mode 36. It will be appreciated that the differences 38 of the difference view mode 36 are concurrently shown with the thrown exceptions 52 in the editor window 30. In this manner, the user may concurrently view both the differences 38 and the results of the code development tool 26 without having to tab between multiple window tabs.

The integrated debugging tool 26A may include other functions. In one example, the integrated debugging tool 26A may be configured to output debugging data 54 that may be presented via the GUI 28 of the IDE 24. The debugging data 54 may include data regarding the call stack of the running code file 32. It will be appreciated that other suitable debugging data 54 may also be output and displayed via the GUI 28 concurrently with the differences 38 between the code file 32 and the baseline code file 40.

In another example, the one of the code development tools performed on the code file 32 includes the breakpoint tool 26B configured to halt execution of the code file 32 at a specified code instruction. FIG. 3 illustrates an example breakpoint 56 set by the user of the computer device 10. The user may enter a user input via the input device suite 20 to set the breakpoint 56, such as, for example, clicking a breakpoint GUI element, pressing a breakpoint hotkey, etc. In the illustrated example, the user has set the breakpoint 56 at the new code instructions 34A at line L5 of the code file 32. As the user is concurrently presented with the differences 38 between the code file 32 and the baseline code file 40 while performing a set breakpoint function of the breakpoint tool 26B, the user may efficiently identify which code instructions 34 of the code file 32 have changed, and appropriately set the breakpoint 56 to debug/analyze the new code instruction 34A. By setting the breakpoint 56, execution of the code file 32 may be halted at line L5 such that the user may view the call stack, inspect variables, and perform other debugging functions to understand a state of the executed code when it reached the specified code instruction.

After the user has set the breakpoint 56 in the code file 32, the breakpoint tool 26B of the integrated debugging tool 26A may be configured to detect that the breakpoint 56 has been reached while the code file 32 is running, and generate a breakpoint event as the debugging event. If the code file 32 is not currently opened in the editor window 30, the IDE 24 may be configured to automatically open the code file 32 in the editor window 30 in the difference view mode 36 based on at least detecting the breakpoint event.

In other examples, processor 18 may be configured to perform functions of the symbolic lookup tool 26C, the intelligent code completion tool 26D, and other development tools 26E on the code file 32, and present a result of those functions in the editor window 30 while in the difference view mode 36. For example, a result of a file look-up function, class look-up function, reference look-up function, etc., of the symbolic lookup tool 26C may be presented in a pop-up window in the editor window 30 concurrently with the differences 38 between the code file 32 and the baseline code file 40. In one example, the IDE 24 executed by the processor 18 may be configured to determine that the result of the function of the symbolic lookup tool 26C occurs in a target code file, which, for example, may be the code file 32, another code file referenced in the code file 32, etc. If the target code file is not currently opened, the IDE 24 may be further configured to open the target code file in the editor window 30 in the difference view mode 36.

As another example, a result of the intelligent code completion tool 26D, such as the remaining letters in a class, file name, predefined variable, etc., may be presented in a pop-up or in mark-up in real time as the user types in the editor window 30 concurrently with the differences 38. In this manner, the user may utilize all of the code development tools 26 afforded by the integrated development environment 24 while the editor window 30 and the IDE 24 are toggled in the difference view mode 36.

Turning back to FIG. 1, the baseline code file 40 may be selected by the user via input to the GUI 28. For example, a code file manager 58 of the IDE 24 may store a plurality of code files saved by the user. The plurality of code files may be presented in a list on the GUI 28 output to the display 12. The user may select both the code file 32 and the baseline code file 40 from among the plurality of code files stored on the computer device 10 for comparison in the difference view mode 36.

As another example, when the user initially opens a code file 32 handled by the code file manager 58, an initial state of the code file 62 may be saved temporarily in memory. The initial state of the code file 62 may be presented to the user in the editor window 30. The processor 18 may be further configured to detect that the user has previously edited or recently changed the code file 32 from its initial state 62 when the code file 32 was opened to an edited code file 64. Upon detecting the change, the processor 18 may be configured to toggle the editor window 30 presenting the code file 32 into the difference view mode 36. In this example, the baseline code file 40 is an initial state 62 of a code file 32 opened via the IDE 24, and the code file 32 includes one or more code changes from the initial state 62 of the code file 32. The code file 32 used in the difference view mode 36 may be updated in real-time as the user edits and changes code instructions 34 and non-instruction portions 44 of the code file 32. An updated difference 38 between the baseline code file 40 (e.g. the initial state 62 of the code file 32) and a current state of the code file 32 (e.g. edited code file 64) may be determined and emphasized in the editor window 30.

Figure 4:
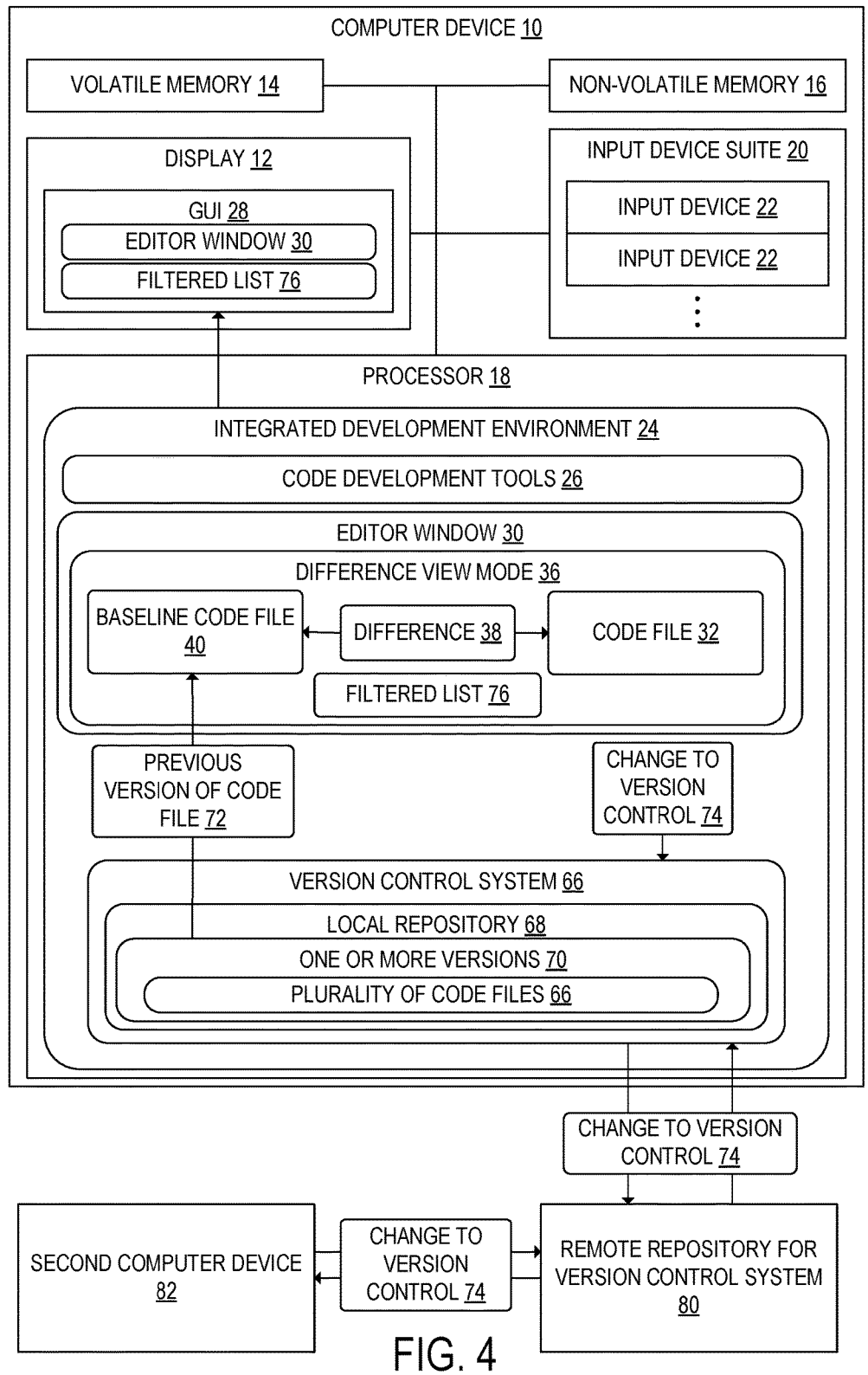
FIG. 4 shows another example integrated development environment implemented by the example computer device of FIG. 1.

FIG. 4 illustrates an example IDE executed by the processor 18 of the computer device 10 that includes a client side of a version control system 66 configured to manage a plurality of code files 68 that includes the code file 32. The version control system 66 includes a local repository 68 that stores one or more versions 70 of the plurality of code files 66. The version control system 66 is configured to manage changes and edits to the one or more versions 70 of the plurality of code files 66. In one example, the version control system 66 may implement a git-based version control. However, it will be appreciated that the version control system 66 may implement any suitable type of version control.

As illustrated in FIG. 4, a previous version of the code file 72 stored by the version control system 66 may be selected as the baseline code file 40 for the difference view mode 36 to be compared to the current version of the code file 32. In one example, the baseline code file 40 may be selected from among the one or more versions 70 of the plurality of code file 66 by the user. In another example, the processor 18 may be configured to programmatically select the baseline code file 40 when there exists an implied baseline for the code file 32, such as, for example, when the user is initiating a change to version control 74 for the plurality of code files 66 managed by the version control system 66. In git-based terms, the change to version control 74 may include a commit, a pull request, etc. However, it will be appreciated that the processes described with reference to FIG. 4 may also be applied to other types of version control systems.

In one example, the processor 18 may be configured to determine that a user is preparing to make the change to version control 74 of the plurality of code files 66 via the version control system 66, such as, for example, a commit or pull request. Based on at least detecting the change to version control 74, the processor 18 may be configured to open a changed code file of the plurality of code files in the editor window 30 in the difference view mode 36 to cause the editor window 30 to emphasize differences 38 between the changed code file of the plurality of code files in the change to version control and a previous version of the changed code file stored via the version control system 66. For example, the processor 18 may be configured to programmatically select the previous version 72 of the code file 32 as the baseline code file 40 when the code file 32 is opened in the editor window 30 in the difference view mode 36 in response to determining that the user is preparing to make the change to version control 74. The previous version 72 of the code file is implied by the change to version control 74 action. That is, the change to version control 74, such as, for example, a commit or pull request, includes one or more changes/edits that will be applied to the previous version of the code file 72 to become the code file 32. Thus, the processor 18 may be configured to select the previous version of the code file 72 as the baseline code file 40, and present the user with the difference 38 between the selected baseline code file 40 and the code file 32.

In one example, the code file 32 may already be opened in the editor window 30 while not in the difference view mode 36. In this example, based on at least determining that the user is preparing to make the change to version control 74, the IDE 24 may be configured automatically transition the editor window 30 into the difference view mode 36, and programmatically select the previous version 72 of the code file 32 as the baseline code file 40 as discussed above. In this manner, when the user is preparing to make the change to version control 74, the IDE 24 is configured to toggle on the difference view mode 36 for the editor window 30 showing the code file 32 and present the user with the difference 36 between the previous version of the code file 72 and the code file 32 so that the user may efficiently view the relevant changes and edits of that change to version control 74.

In one example, the change to version control 74 may include changes to more than one code file of the plurality of code files 66. Based on detecting the change to version control 74, the processor 18 may be configured to determine a filtered list 76 of the plurality of code files 66 that excludes one or more unchanged code files that are unchanged in the user's change to version control 74 of the plurality of code files 66. That is, an example change to version control 74 may only include changes to one of the code files of the plurality of code files 66, such as the code file 32, and no changes to the other code files of the plurality of code files 66. The processor 18 may be configured to generate a list of the plurality of code files 66 and filter the list to exclude the other code files that were not changed in the example change to version control 74. The processor 18 may be further configured to present the filtered list 76 on the display 12 in the difference view mode 36 via the GUI 28 of the IDE 24. In another example, each of the more than one changed code files may be opened in editor windows 30 in the difference view mode 36 and compared to their respective baseline code files, such as previous versions of each of those changed code files.

Figure 5:
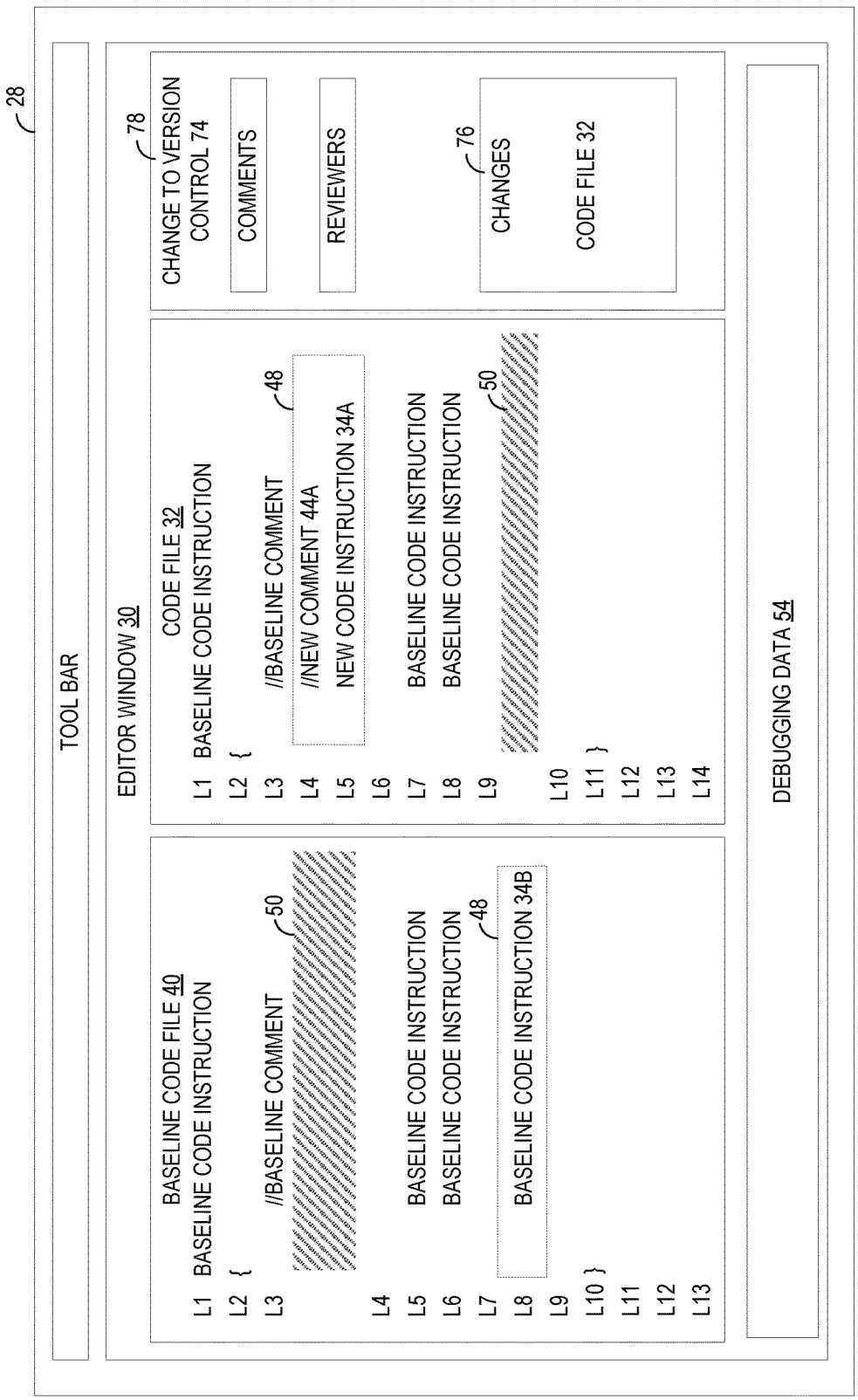
FIG. 5 shows another example graphical user interface including a change to version control and a filtered list of changed code files of the integrated development environment implemented by the computer device of FIG. 1.

Turning briefly to FIG. 5, an example GUI 28 for the IDE 24 is illustrated. As shown, the user may prepare a change to version control 74 via a version control GUI 78 element of the example GUI 28. Using the version control GUI 78, the user may prepare one or more commits, which each include changes to one or more of the plurality of code files 66. In the illustrated example, the selected commit includes changes to the code file 32. Based on the user selected of that commit, the processor 18 may be configured to determine the filtered list 76 that excludes the other unchanged code files of the plurality of code files 66. In this example, the plurality of code files 66 may include a second code file, a third code file, etc., that were not changed in the selected change to version control 74, and are thus excluded from the illustrated filtered list 76. The determined filtered list 76 is presented on the display 12 via the GUI 28 of the IDE 24. The user may then select one of the code files in the filtered list 76 to review the relevant changes. It should be appreciated that the code files may also be opened via other means and presented in the editor window 30 in the difference view mode 36 for review by the user. For example, the code files may be opened in response to a detected debugging event such as an exception or breakpoint, in response to a result of a symbolic lookup, etc.

In this illustrated example, the user selects the code file 32. As discussed previously, the change to version control 74 includes an implied baseline for the changed code files. Thus, the processor 18 may be configured to select the previous version of the code file 72 as the baseline code file, and open the code file 32 in the editor window 30 in the difference view mode 36. After opening the code file 32 in the difference view mode 36, the processor 18 may be configured to display the baseline code file 40, the code file 32, and emphasize the differences 38 between the baseline code file 40 and the code file 32. As discussed above, the user may further apply one or more code development tools 26 to the code file, such as, for example, the integrated debugging tool 26A, the breakpoint tool 26B, etc., to test the changes included in the selected change to version control 74. In this manner, the user may efficiently review the relevant changes before finalizing the change to version control 74.

Turning back to FIG. 4, the client-side of the version control system 66 may be configured to communicate with a remote repository for the version control system 80. The remote repository for the version control system 80 may be configured to maintain a master version of the plurality of code files 66 that may be pulled by a plurality of computer devices of a plurality of developers that are collaborating to develop the plurality of code files 66. For example, a second computer device 82 implementing the IDE 24 may also communicate with the remote repository for the version control system 66. The computer device 10 and the second computer device 82 may be configured to send changes to version control 74 to the remote repository, which may then be merged with the master version of the plurality of code files 66 after being accepted by an administrator user of the remote repository 80.

For example, after the user has prepared and reviewed their change to version control 74, the user may generate a pull request via their client side of the version control system 66. The pull request may push the one or more changed code files (e.g. code file 32) to the remote repository 80, and request to merge the change to version control 74 with the master version of the plurality of code files 66.

On the other hand, the user of the computer device 10 may review changes to version control 74 prepared by other users and pushed to the remote repository 80. For example, the change to version control 74 of the plurality of code files 66 may be made by a user of the second computer device 82. The user of the second computer device 82 may prepare a pull request for the change to version control 74, which will push the changed code files of the plurality of code files 66 to the remote repository 80. The processor 18 of the computer device 10 may be configured to receive a notification for the pull request of the second computer device 82. The processor 18 may then pull the one or more changed code files included in the change to version control 74 from the remote repository. The processor 18 may then determine the filtered list 76 of the plurality of code files 66 that excludes one or more unchanged code files that are unchanged in the user's change to version control 74 of the plurality of code files 66, and present the filtered list 30 to the user via the GUI 28 of the IDE 24. The user of the computer device 10 may then select one of the changed code files from the filtered list 76 for review. Based on the user selecting one of the changed code files, the selected code file may be opened in the editor window 30 in the difference view mode 36. As another example, code files of the second user's change to version control 74 may be opened in the difference view mode 36 in response to a debugging event generated by the integrated debugging tool 26 while running the code files, in response to a result of the symbolic lookup tool 26C, etc., as described above.

In one example, the user selects the code file 32 from the filtered list 76 for review. As discussed previously, the change to version control 74 initiated by the second computer device 82 includes an implied baseline for each of the changed code files. Thus, the processor 18 may be configured to select the previous version of the code file 72 as the baseline code file 40, and opens the selected code file 32 in an editor window 30 in the difference view mode 36. The code file from the change to version control 74 selected by the user and the implied baseline code file for the selected code file are presented to the user via the editor window 30, and the differences 38 may be emphasized as discussed herein. In this manner, the user of the computer device 10 may efficiently review the relevant changes to each code file in the change to version control 74 initiated by the user of the second computer device 82. The user of the computer device 10 may then accept the change to version control 74 after review, and cause the remote repository 80 for the version control system to merge the change to version control 74 with the master version of the plurality of code files 66 stored on the remote repository 80.

Figure 6:
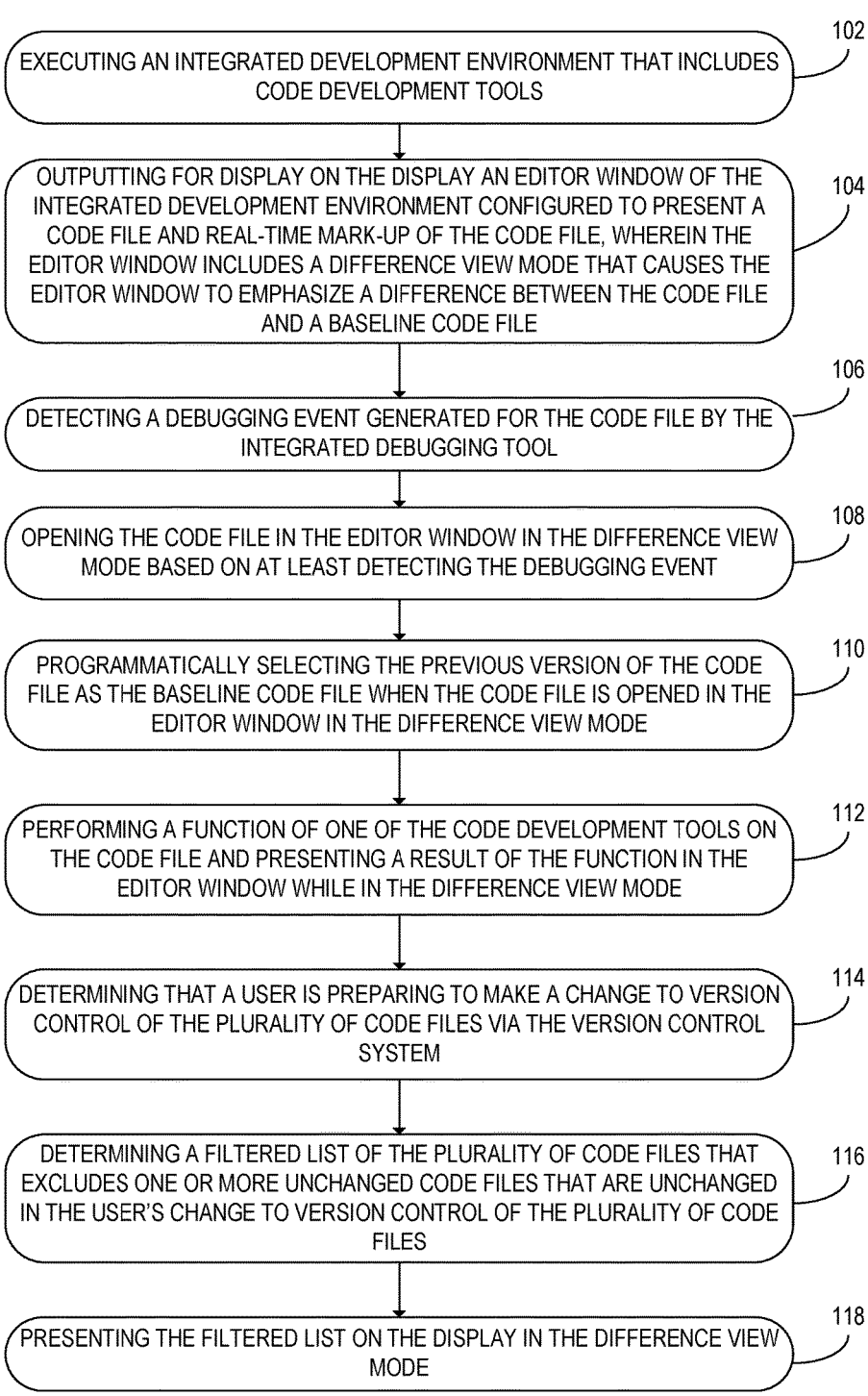
FIG. 6 shows a computer-implemented method for a difference view mode of an integrated development environment that may be implemented by the computer device of FIG. 1.

FIG. 6 shows a flowchart of a computer-implemented method 100. The method 100 may be implemented by the computer device 10 of FIG. 1. At 102, the method 100 may include executing an integrated development environment that includes code development tools. FIG. 1 illustrated an example integrated development environment 24 that includes a plurality of different code development tools 26, such as, for example, an integrated debugging tool 26A, a breakpoint tool 26B, a symbolic lookup tool 26C, an intelligent code completion tool 26D, and other development tools 26E.

At 104, the method 100 may include outputting for display on the display an editor window of the integrated development environment configured to present a code file and real-time mark-up of the code file, wherein the editor window includes a difference view mode that causes the editor window to emphasize a difference between the code file and a baseline code file. FIG. 2 illustrates an example GUI 28 including the editor window 30. The editor window 30 may be configured to display each of the code instructions 34 of the code file 32. The editor window 30 may also be configured to display GUI elements for organizing the displayed code instructions 34, such as, for example, line numbers. The editor window 30 may also display real-time mark-up of the code file 32 as the user edits/changes the code instructions 34, adds/deletes comments, or otherwise edits the code file 32. For example, the editor window 26 may indicate one or more syntax errors in the code file 32.

In one example, the code file 32 may already be opened in the editor window 30 while not in the difference view mode 36. In this example, the difference view mode for the editor window may be toggled on in response to a user input, such as an input to compare two or more code files. As another example, the difference view mode may be toggled on in response to a new user change or edit to an opened code file. In this example, the baseline code file is an initial state of a code file opened via the integrated development environment, and the code file includes one or more code changes from the initial state of the code file.

In another example, the code file may not yet be opened in the editor window 30. In this example, the method 100 may include opening the code file in the difference view mode via steps 106 and 108. At 106, the method 100 may include detecting a debugging event generated for the code file by the integrated debugging tool. The debugging event may include an exception thrown by the integrated debugging tool, a breakpoint event of a breakpoint set via a breakpoint tool 26B, etc.

At 108, the method 100 may include opening the code file in the editor window in the difference view mode based on at least detecting the debugging event. For example, based on at least detecting that an exception was thrown in the code file 32 while running a plurality of code files that includes the code file 32, the method 100 may open the code file 32 in the difference view mode. As another example, based on at least detecting that a breakpoint has been reached while running the code file 32, the method 100 may open the code file 32 in the difference view mode. It should be appreciated that the code file 32 may be opened in the difference view mode in response to other events. For example, if a result of the symbolic lookup tool 26C is located in the code file 32, then the method 100 may open the code file 32 in the difference view mode.

At 110, the method 100 may include programmatically selecting the previous version of the code file as the baseline code file when the code file is opened in the editor window in the difference view mode. The previous version of the code file may be selected as the baseline code file in response to a user action that includes an implied baseline. In one example, the integrated development environment further includes a version control system configured for managing a plurality of code files that includes the code file. One example version control system may be a git-based version control. However, it will be appreciated that other types of version controls may be utilized for method 100. When the integrated development environment detects that the user is preparing a change to version control for the plurality of code files, the method 100 may open a changed code file, such as the code file 32, in the editor window 30 in the difference view mode 36, and may select the previous version of the code file as the baseline code file. In this example, the baseline code file is a previous version of the code file stored by the version control system. The GUI 28 may display both the code file and the baseline code file, and emphasize the differences between the code file and the baseline code file.

At 112, the method 100 may include performing a function of one of the code development tools on the code file and presenting a result of the function in the editor window while in the difference view mode. In one example, the one of the code development tools includes an integrated debugging tool configured for throwing exceptions within the editor window while in the difference view mode. The integrated debugging tool 26A may include other functions. In one example, the integrated debugging tool 26A may be configured to output debugging data 54 that may be presented via the GUI 28 of the IDE 24. The debugging data 54 may include data regarding the call stack of the running code file 32. It will be appreciated that other suitable debugging data 54 may also be output and displayed via the GUI 28 concurrently with the differences 38 between the code file 32 and the baseline code file 40. The differences 38 of the difference view mode 36 are concurrently shown with the thrown exceptions 52 and other results of the integrated debugging tool in the editor window 30. In this manner, the user may concurrently view both the differences 38 and the results of the code development tool 26 without having to tab between multiple window tabs.

In another example, the one of the code development tools includes a breakpoint tool configured for halting execution of the code file at a specified line of code. FIG. 3 illustrates an example breakpoint 56 set by the user of the computer device 10. The user may enter a user input via the input device suite 20 to set the breakpoint 56, such as, for example, clicking a breakpoint GUI element, pressing a breakpoint hotkey, etc. The functions of other development tools 26 may also be performed on the code file 32, and the results presented via the GUI 28.

While performing the function of one of the code development tools at step 112, the method 100 may be configured to open one or more code files in the editor window 30 in the difference view mode 36 in response to an event of one of the code development tools. For example, a debugging event such as an exception or breakpoint event, a result of a symbolic lookup, etc.

At 114, the method 100 may include determining that a user is preparing to make a change to version control of the plurality of code files via the version control system. In a git-based version control system, the changes to version control may include commits, pull requests, etc. However, it will be appreciated that the method 100 may also be applied to other types of version control systems.

At 116, the method 100 may include determining a filtered list of the plurality of code files that excludes one or more unchanged code files that are unchanged in the user's change to version control of the plurality of code files. For example, the change to version control 74 may only include changes to one of the code files of the plurality of code files 66, such as the code file 32, and no changes to the other code files of the plurality of code files 66. The method 100 may include generating a list of the plurality of code files 66 and filter the list to exclude the other code files that were not changed in the example change to version control 74.

At 118, the method 100 may include presenting the filtered list on the display in the difference view mode. The filtered list may be shown to the user view the GUI 28 of the integrated development environment 24. If the user selects one of the changed code files in the filtered list, the method 100 may include opening the selected code file in an editor window in the difference view mode, and emphasizing the differences between the previous version of the selected code file and the selected code file.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
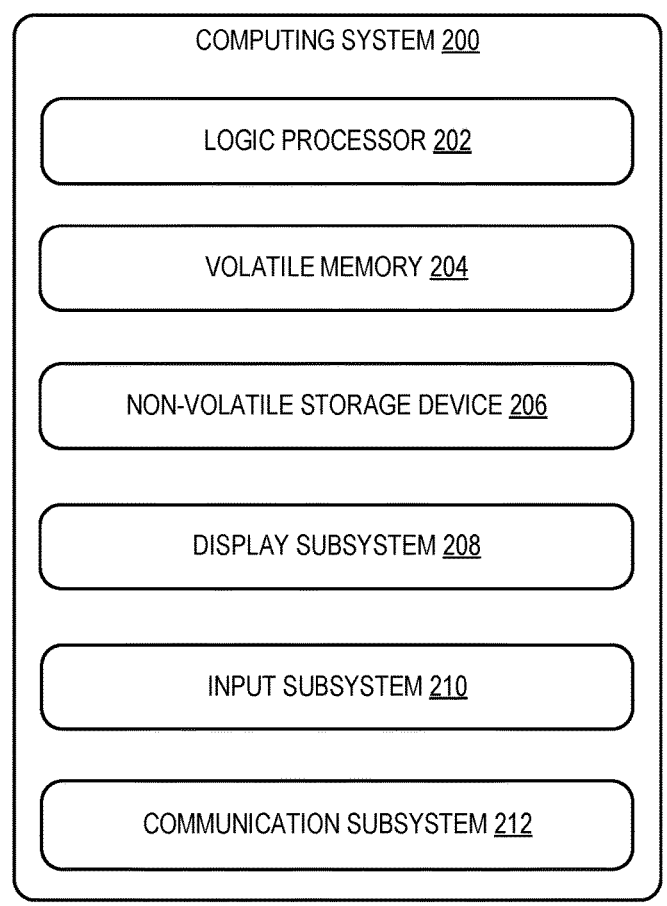
FIG. 7 shows a schematic representation of an example computing system, according to one embodiment of the present disclosure.

FIG. 7 schematically shows a non-limiting embodiment of a computing system 200 that can enact one or more of the methods and processes described above. Computing system 200 is shown in simplified form. Computing system 200 may, for example, embody the computer device 10 of FIG. 1, or may instead embody some other computing system. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented/virtual reality devices.

Computing system 200 includes a logic processor 202, volatile memory 204, and a non-volatile storage device 206. Computing system 200 may optionally include a display subsystem 208, input subsystem 210, communication subsystem 212, and/or other components not shown in FIG. 7.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 202 may include one or more physical processors (hardware) configured to execute software instructions. Additionally or alternatively, the logic processor 202 may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor 202 optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 200 implemented to perform a particular function. In some cases, a program may be instantiated via logic processor 202 executing instructions held by non-volatile storage device 206, using portions of volatile memory 204. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 208 may be used to present a visual representation of data held by non-volatile storage device 206. As the herein described methods and processes change the data held by the non-volatile storage device 206, and thus transform the state of the non-volatile storage device 206, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem 210 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 212 may be configured to communicatively couple computing system 200 with one or more other computing devices. Communication subsystem 212 may include wired and/or wireless communication devices compatible with one or more different communication protocols. As non-limiting examples, the communication subsystem 212 may be configured for communication via a wireless telephone network, or a wired or wireless local- or wide-area network. In some embodiments, the communication subsystem 212 may allow computing system 200 to send and/or receive messages to and/or from other devices via a network such as the Internet.

The following paragraphs provide additional support for the claims of the subject application. One aspect provides a computer device comprising a display and a processor configured to execute an integrated development environment that includes code development tools, and output for display on the display an editor window of the integrated development environment configured to present a code file and real-time mark-up of the code file. The editor window includes a difference view mode that causes the editor window to emphasize a difference between the code file and a baseline code file. The processor is further configured to perform a function of one of the code development tools on the code file and present a result of the function in the editor window while in the difference view mode. In this aspect, additionally or alternatively, the one of the code development tools may include an integrated debugging tool configured to generate debugging events, and the processor may be further configured to detect a debugging event generated for the code file by the integrated debugging tool, and open the code file in the editor window in the difference view mode based on at least detecting the debugging event. In this aspect, additionally or alternatively, the debugging events may include an exception thrown for the code file, and the processor may be further configured to present the exception in the editor window in the difference view mode. In this aspect, additionally or alternatively, the integrated debugging tool may include a breakpoint tool configured to halt execution of the code file at a specified line of code, and the detected debugging event may include a breakpoint event. In this aspect, additionally or alternatively, the one of the code development tools may include a symbolic lookup tool, and the processor may be further configured to determine that the result of the function of the symbolic lookup tool occurs in a target code file, and open the target code file in the editor window in the difference view mode. In this aspect, additionally or alternatively, the baseline code file may be an initial state of the code file opened via the integrated development environment, and the code file presented by the editor window in the difference view mode may include one or more code changes from the initial state of the code file. In this aspect, additionally or alternatively, the integrated development environment may further include a version control system configured to manage a plurality of code files that includes the code file, and the baseline code file may be a previous version of the code file stored by the version control system. In this aspect, additionally or alternatively, the processor may be further configured to programmatically select the previous version of the code file as the baseline code file when the code file is opened in the editor window in the difference view mode. In this aspect, additionally or alternatively, the processor may be further configured to determine that a user is preparing to make a change to version control of the plurality of code files via the version control system, and open a changed code file of the plurality of code files in the editor window in the difference view mode to cause the editor window to emphasize differences between the changed code file of the plurality of code files in the change to version control and a previous version of the changed code file stored via the version control system. In this aspect, additionally or alternatively, the change to version control of the plurality of code files may be made by a user of a second computer device. In this aspect, additionally or alternatively, the processor may be further configured to determine a filtered list of the plurality of code files that excludes one or more unchanged code files that are unchanged in the user's change to version control of the plurality of code files, and present the filtered list on the display.

Another aspect provides a method comprising, at a computer device including a processor, executing an integrated development environment that includes code development tools, and outputting for display on the display an editor window of the integrated development environment configured to present a code file and real-time mark-up of the code file. The editor window includes a difference view mode that causes the editor window to emphasize a difference between the code file and a baseline code file. The method further comprises performing a function of one of the code development tools on the code file and presenting a result of the function in the editor window while in the difference view mode. In this aspect, additionally or alternatively, the one of the code development tools may include an integrated debugging tool configured for generating debugging events, and the method may further comprise detecting a debugging event generated for the code file by the integrated debugging tool, and opening the code file in the editor window in the difference view mode based on at least detecting the debugging event. In this aspect, additionally or alternatively, the debugging events may include an exception thrown for the code file, and the method may further comprise presenting the exception in the editor window in the difference view mode. In this aspect, additionally or alternatively, the integrated debugging tool may include a breakpoint tool configured for halting execution of the code file at a specified line of code, and the detected debugging event may include a breakpoint event. In this aspect, additionally or alternatively, the baseline code file may be an initial state of the code file opened via the integrated development environment, and the code file presented by the editor window in the difference view mode may include one or more code changes from the initial state of the code file. In this aspect, additionally or alternatively, the integrated development environment may further include a version control system configured for managing a plurality of code files that includes the code file, and the baseline code file may be a previous version of the code file stored by the version control system. In this aspect, additionally or alternatively, the method may further comprise programmatically selecting the previous version of the code file as the baseline code file when the code file is opened in the editor window in the difference view mode. In this aspect, additionally or alternatively, the method may further comprise determining that a user is preparing to make a change to version control of the plurality of code files via the version control system, and opening a changed code file of the plurality of code files in the editor window in the difference view mode to cause the editor window to emphasize differences between the changed code file of the plurality of code files in the change to version control and a previous version of the changed code file stored via the version control system.

Another aspect provides a computer device comprising a display, and a processor configured to execute an integrated development environment that includes code development tools, determine that a user is preparing to make a change to version control of a plurality of code files via a version control system, open a changed code file of the plurality of code files in an editor window in a difference view mode to cause the editor window to emphasize differences between the changed code file of the plurality of code files in the change to version control and a previous version of the changed code file stored via the version control system, and perform a function of one of the code development tools on the changed code file and present a result of the function in the editor window while in the difference view mode.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer device comprising:
 a display; and
 a processor configured to:
 execute an integrated development environment that includes code development tools, wherein one of the code development tools includes an integrated debugging tool configured to generate debugging events;
 output for display on the display an editor window of the integrated development environment configured to present a code file and real-time mark-up of the code file, wherein the editor window includes a difference view mode that causes the editor window to emphasize a difference between the code file and a baseline code file;
 detect a debugging event generated for the code file by the integrated debugging tool;
 open the code file in the editor window in the difference view mode based on at least detecting the debugging event;
 programmatically select a previous version of the code file as the baseline code file when the code file is opened in the editor window in the difference view mode; and
 perform a function of one of the code development tools on the code file and present a result of the function of one of the code development tools in the editor window while in the difference view mode.

2. The computer device of claim 1, wherein the debugging events include an exception thrown for the code file, and wherein the processor is further configured to present the exception in the editor window in the difference view mode.

3. The computer device of claim 1, wherein the integrated debugging tool includes a breakpoint tool configured to halt execution of the code file at a specified line of code, and wherein the detected debugging event includes a breakpoint event.

4. The computer device of claim 1, wherein the one of the code development tools includes a symbolic lookup tool, and wherein the processor is further configured to:
 determine that a result of a function of the symbolic lookup tool occurs in a target code file; and
 open the target code file in the editor window in the difference view mode.

5. The computer device of claim 1, wherein the baseline code file is an initial state of the code file opened via the integrated development environment, and the code file presented by the editor window in the difference view mode includes one or more code changes from the initial state of the code file.

6. The computer device of claim 1, wherein the integrated development environment further includes a version control system configured to manage a plurality of code files that includes the code file, and wherein the baseline code file is a previous version of the code file stored by the version control system.

7. The computer device of claim 6, wherein the processor is further configured to:
  determine that a user is preparing to make a change to version control of the plurality of code files via the version control system; and
  open a changed code file of the plurality of code files in the editor window in the difference view mode to cause the editor window to emphasize differences between the changed code file of the plurality of code files in the change to version control of the plurality of code files and a previous version of the changed code file stored via the version control system.

8. The computer device of claim 7, wherein the change to version control of the plurality of code files is made by a user of a different computer device.

9. The computer device of claim 8, wherein the processor is further configured to:
  determine a filtered list of the plurality of code files that excludes one or more unchanged code files that are unchanged in the user's change to version control of the plurality of code files; and
  present the filtered list of the plurality of code files on the display.

10. A method comprising:
  at a computer device including a processor:
  executing an integrated development environment that includes code development tools, wherein one of the code development tools includes an integrated debugging tool configured to generate debugging events;
  outputting for display on the display an editor window of the integrated development environment configured to present a code file and real-time mark-up of the code file, wherein the editor window includes a difference view mode that causes the editor window to emphasize a difference between the code file and a baseline code file;
  detecting a debugging event generated for the code file by the integrated debugging tool;
  opening the code file in the editor window in the difference view mode based on at least detecting the debugging event;
  programmatically selecting a previous version of the code file as the baseline code file when the code file is opened in the editor window in the difference view mode; and
  performing a function of one of the code development tools on the code file and presenting a result of the function of one of the code development tools in the editor window while in the difference view mode.

11. The method of claim 10, wherein the debugging events include an exception thrown for the code file, and wherein the method further comprises presenting the exception in the editor window in the difference view mode.

12. The method of claim 10, wherein the integrated debugging tool includes a breakpoint tool configured to halt execution of the code file at a specified line of code, and wherein the detected debugging event includes a breakpoint event.

13. The method of claim 10, wherein the baseline code file is an initial state of the code file opened via the integrated development environment, and the code file presented by the editor window in the difference view mode includes one or more code changes from the initial state of the code file.

14. The method of claim 10, wherein the integrated development environment further includes a version control system configured to manage a plurality of code files that includes the code file, and wherein the baseline code file is a previous version of the code file stored by the version control system.

15. The method of claim 14, further comprising:
  determining that a user is preparing to make a change to version control of the plurality of code files via the version control system; and
  opening a changed code file of the plurality of code files in the editor window in the difference view mode to cause the editor window to emphasize differences between the changed code file of the plurality of code files in the change to version control of the plurality of code files and a previous version of the changed code file stored via the version control system.

16. A computer device comprising:
  a display; and
  a processor configured to:
  execute an integrated development environment that includes code development tools; wherein one of the code development tools includes an integrated debugging tool configured to generate debugging events;
  determine that a user is preparing to make a change to version control of a plurality of code files via a version control system;
  open a changed code file of the plurality of code files in an editor window in a difference view mode to cause the editor window to emphasize differences between the changed code file of the plurality of code files in the change to version control of the plurality of code files and a previous version of the changed code file stored via the version control system;
  detect a debugging event generated for the code file by the integrated debugging tool;
  open the code file in the editor window in the difference view mode based on at least detecting the debugging event;
  programmatically select a previous version of the code file as the baseline code file when the code file is opened in the editor window in the difference view mode; and
  perform a function of one of the code development tools on the changed code file and present a result of the function of one of the code development tools in the editor window while in the difference view mode.

\* \* \* \* \*